United States Patent
Lee et al.

(10) Patent No.: US 6,466,560 B1
(45) Date of Patent: Oct. 15, 2002

(54) SYSTEM AND METHOD FOR OBTAINING EC/IO FOR USE IN POSITIONING A BASE STATION FOR MOBILE COMMUNICATION NETWORK

(75) Inventors: Sang-keun Lee; Chil-hyun Baek, both of Seoul (KR)

(73) Assignee: Hansol PCS Co., Ltd., Seoul (KR)

( * ) Notice: Subject to any disclaimer, the term of this patent is extended or adjusted under 35 U.S.C. 154(b) by 0 days.

(21) Appl. No.: 09/207,097

(22) Filed: Dec. 7, 1998

(30) Foreign Application Priority Data

Jul. 28, 1998 (KR) .............................. 98-30282

(51) Int. Cl.[7] ................................. H04Q 7/00
(52) U.S. Cl. ..................... 370/335; 370/342; 455/446
(58) Field of Search ................................. 370/335, 328, 370/342; 455/446, 423, 424, 524, 67.1, 67.7, 67.4

(56) References Cited

U.S. PATENT DOCUMENTS

| | | | |
|---|---|---|---|
| 5,802,473 A | * | 9/1998 | Rutledge ................... 455/67.1 |
| 6,006,095 A | * | 12/1999 | Bernardin ................... 455/446 |
| 6,014,565 A | * | 1/2000 | Bonta .......................... 455/446 |
| 6,094,580 A | * | 7/2000 | Yu .............................. 455/446 |
| 6,188,894 B1 | * | 2/2001 | Clancy ........................ 455/446 |
| 6,208,871 B1 | * | 3/2001 | Hall ........................... 370/335 |

* cited by examiner

Primary Examiner—Brian Zimmerman
(74) Attorney, Agent, or Firm—Merchant & Gould P.C.

(57) ABSTRACT

A system and a method for obtaining Ec/Io for a predetermined site for use in positioning a base station for a mobile communication network. Continuous waves having a constant output power and frequencies different from each other are generated by many continuous wave generators. The continuous waves are received from the continuous wave generators so as to measure RSSI of the continuous waves and GPS information. Ec/Io of a predetermined site is measured from the RSSI of the continuous waves and the GPS information. Accordingly, the measurement for positioning a base station is performed with regard to adjacent interference under actual circumstances so that a new base station can be positioned on a proper site.

16 Claims, 6 Drawing Sheets

SYSTEM AND METHOD FOR OBTAINING EC/IO FOR USE IN POSITIONING A BASE STATION FOR MOBILE COMMUNICATION NETWORK

BACKGROUND OF THE INVENTION

1. Field of the Invention

The present invention relates to a system and a method for positioning a base station for a mobile communication network, and more particularly, to a system and a method for positioning a base station for a mobile communication network using CDMA, in consideration of interference caused by adjacent base stations.

2. Prior Art

It is necessary to verify whether or not a base station is suited for the site when the base station for communicating with a mobile station (terminal) is installed in a mobile communication network.

There has been used a continuous wave transmitter and receiver for positioning the base station in the past.

It is necessary to install a new base station when shadow area exists between the converges of existing base stations. In this case, the continuous wave transmitter is installed on a candidate base station, in such a manner that it generates the continuous wave continuously having frequency which hasn't been broadcasted from adjacent base stations. Meanwhile, under the circumstances, the continuous wave receiver being carried by a vehicle measures, RSSI (Received Signal Strength Indication) of the continuous wave while a vehicle loading a continuous wave receiver is running around the continuous wave transmitter, in order to determine the position of the new base station.

At this time, judging a position at which the RSSI is equal to −80 dBm as a coverage boundary of the base station (capable of changing according to a criterion), the new base station is determined in consideration of the overlapping portion of a new coverage and the existent coverage.

In the above description, Ec/It (Accumulated pilot energy ratio during a PN chip period with respect to a maximum spectrum density in a receiving band) is estimated at −15 db (a minimum value for communicating). However, since the Ec/It may become less than −15 db due to the interference of the adjacent base station actually, there are problems in determining the position of the base station according to the conventional art. Here, Ec/It=Ec/(Io+Ioc+Now), and Ec is an accumulated pilot energy during a PN chip period, It is total interference, Io is interference of a corresponding cell, Ioc is interference of an adjacent cell, and NoW is thermal noise existing in a natural world. In the present description, the Ec/It is expressed to Ec/Io for the convenience of illustration.

SUMMARY OF THE INVENTION

The present invention has been proposed to overcome the above-described problems in the prior art, and accordingly it is the object of the present invention to provide a system for positioning a base station for mobile communication network, capable of positioning a base station properly by simultaneously measuring a continuous wave signal and a common frequency signal gathering from an adjacent base station with regard to a circumferential interference under actual circumstances.

It is another object of the present invention to provide a method for positioning a base station by using the system for positioning a base station.

To achieve the above object, the present invention provides a system for positioning a base station used for a mobile communication system using CDMA, comprising: a plurality of continuous wave generators for generating continuous waves of constant output power, the continuous waves having frequencies different from each other; a continuous wave receiver for receiving the continuous waves from the plural of continuous wave generators so as to measure RSSI of the continuous waves, and receiving G.P.S. information at the same time; and a computer for receiving the RSSI of the continuous waves and the G.P.S. information so as to measure Ec/Io of a predetermined site.

The continuous wave generator comprises: a key pad for selecting an output frequency and an output power; a microprocessor for receiving an input of the key pad so as to control the output frequency and the output power, the microprocessor for making a command to display the values of the output frequency and the output power, a frequency synthesizer for receiving the command from the microprocessor to output a selected frequency; an output power regulator for receiving the command from the microprocessor to control an output power of the selected frequency; a high-output amplifier for amplifying a signal from the output power regulator; and a transmitting antenna for broadcasting an output of the high-output amplifier.

The continuous wave receiver comprises: a receiving antenna for receiving the continuous waves; a frequency generator for periodically generating a plurality of frequencies different from each other; a frequency synthesizer for synthesizing an output frequency of the frequency generator and a signal received on the receiving antenna so as to convert into an intermediate frequency; a switching part for outputting a predetermined signal by periodically switching the intermediate frequency from the frequency synthesizer; a RSSI sensor for sensing the RSSI from an output of the switching part; an A/D converter for converting the RSSI into a digital signal; a decoder for receiving the digital signal of the RSSI while controlling the output frequency from the frequency generator and a switching operation of the switching part; a G.P.S. antenna for receiving G.P.S. signal; and a G.P.S. receiver for measuring latitude, longitude and time information from the G.P.S. signal.

Meanwhile, a method for positioning a base station used for a mobile communication system using CDMA, comprising the steps of: generating continuous waves having a constant output power and frequencies different from each other, by using a plurality of continuous wave generators; receiving the continuous wave from the plural of continuous wave generators so as to measure RSSI of the continuous waves, and receiving GSP information at the same time; and measuring Ec/Io of a predetermined site from the RSSI of the continuous waves and the G.P.S. Information.

In the step of measuring the RSSI of the continuous wave, and at the same time, receiving the G.P.S. information by using the continuous wave receiver, the frequency of adjacent common base station is also received so as to measure RSSI thereof.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Hereinafter, the present invention will be described in detail with reference to the accompanying drawings.

Figure 1:
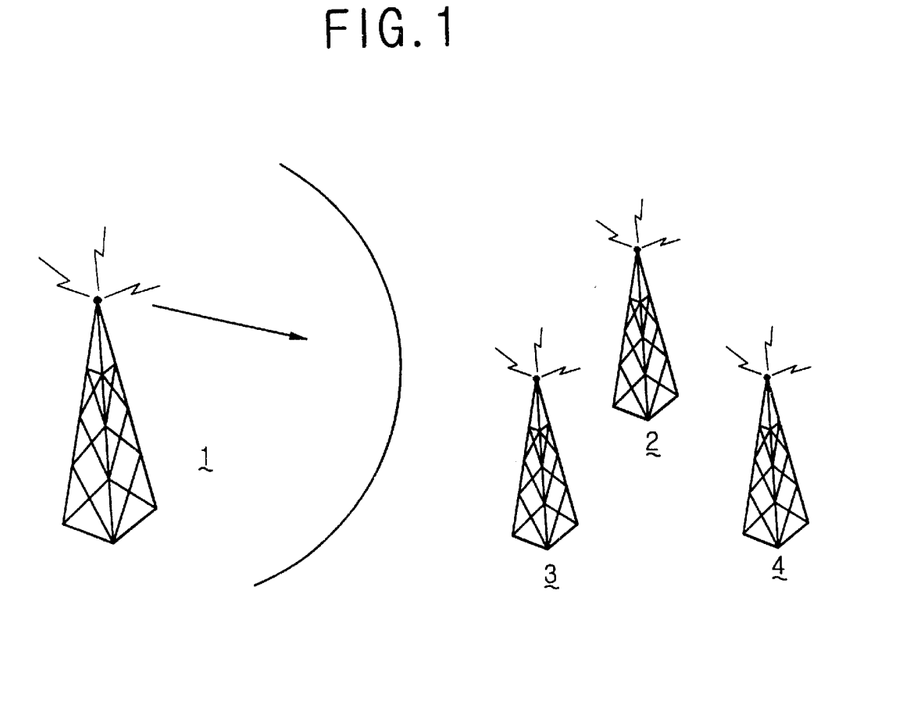
FIG. 1 is a drawing showing continuous wave transmitters which are installed on candidate base stations in shadow area adjacent to a coverage of the conventional base station.
Figure 2:
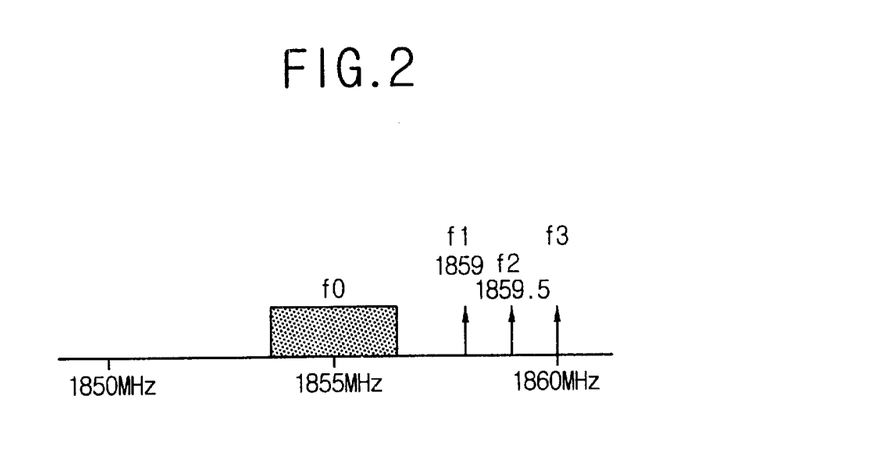
FIG. 2 is a drawing showing common frequency f0 and different continuous wave frequencies f1, f2 and f3.
Figure 3:
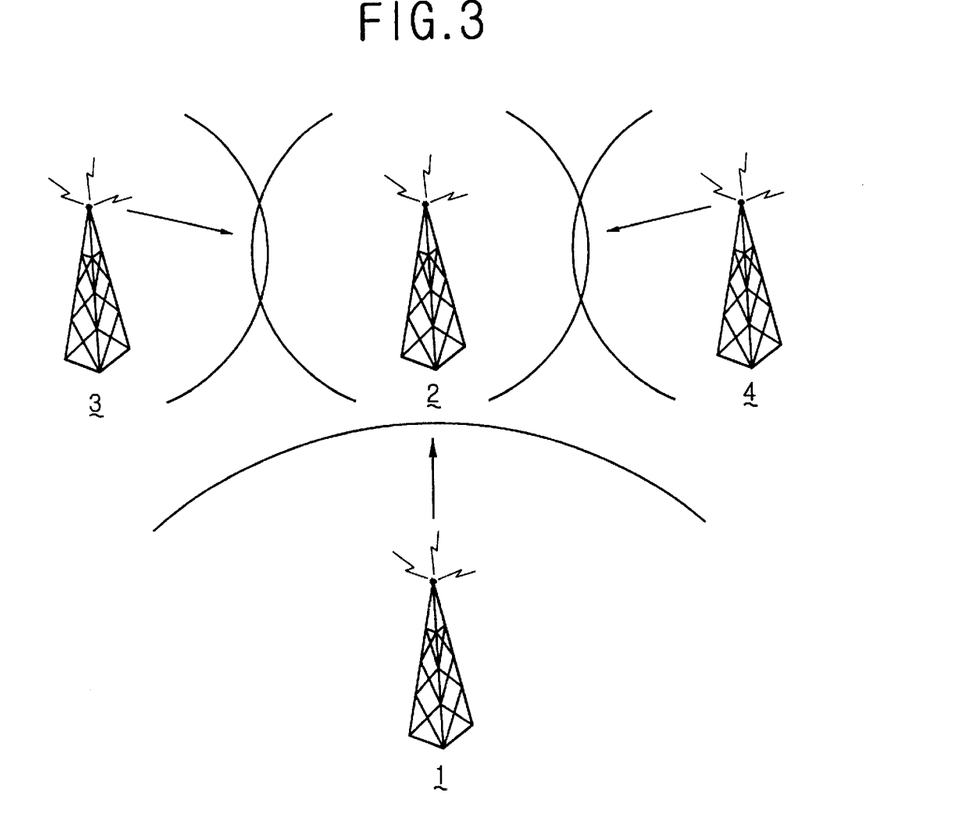
FIG. 3 is a drawing showing a plurality of candidate base stations which are installed at different areas respectively.

FIG. 1 is a drawing showing three continuous wave transmitters which are installed on candidate base stations 2, 3 and 4 in shadow area adjacent to a coverage of the conventional base station 1. FIG. 2 is a drawing showing commercial frequency f0 and different continuous wave frequencies f1, f2 and f3, and FIG. 3 is a drawing showing a plurality of candidate base stations 2, 3 and 4 which are installed at different areas, respectively.

As shown in FIG. 2, transmitters output continuous waves continuously having frequencies f1, f2 and f3 different from frequency f0 used by the existing base station among the common frequency band of mobile communication network.

Figure 4:
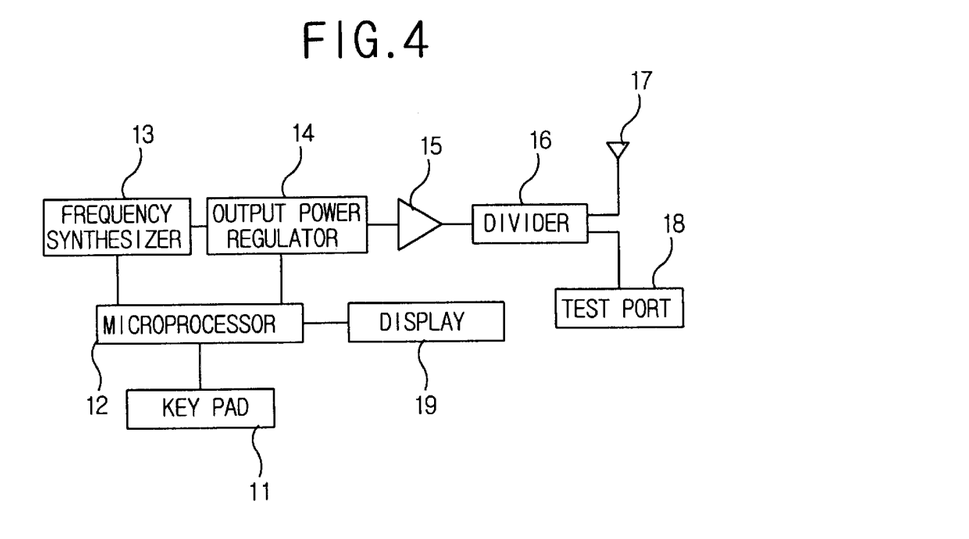
FIG. 4 is a block diagram showing a continuous wave transmitter according to an embodiment of the present invention.

FIG. 4 is a block diagram showing a continuous wave transmitter according to an embodiment of the present invention.

As shown in FIG. 4, a continuous wave transmitter according to the present invention comprises a key pad 11 for selecting an output frequency and an output power, a microprocessor 12 for receiving an input from the key pad 11 to control a system, a frequency synthesizer 13 for generating a selected frequency according to the output of the microprocessor 12, an output power regulator 14 for controlling the output power of the frequency synthesizer 13 according to the output of the microprocessor 12, a high-output amplifier 15 for amplifying an output signal from the output power regulator 14, a divider 16 for branching the output power of the high-output amplifier 15, a transmitting antenna 17 for transmitting one of the branching signal from the divider 16, a test port 18 for testing the other branching signal from the divider 16, and a display 19 for displaying a selected frequency and an output level according to the output of the microprocessor 12.

Hereinafter, the operation of the continuous wave transmitter according to the present invention will be described in detail.

In the key pad 11, the frequencies (f1, f2 and f3 are 1859/1859.5/1860 MHz respectively) different from the frequency (f0; 1.23 MHz band in which a central frequency is 1855 MHz) used by the existing base station among the commercial frequency band ($1850^j$=1860 MHz), and an output power (42 dBm in the present embodiment) are selected simultaneously.

The microprocessor 12 receives an input from the key pad 11 to display the selected frequency and the output on a display 19, and direct the frequency synthesizer 13 to generate the selected frequency and the output power regulator 14 to control the output power of the generated frequency.

A signal amplified at the high-output amplifier 15 after passing through the output power regulator 14 is branched by the divider 16. And, the branched signal is supplied to the transmitting antenna 17 and the test port 18 so as to be capable of being broadcasted and tested.

Figure 5:
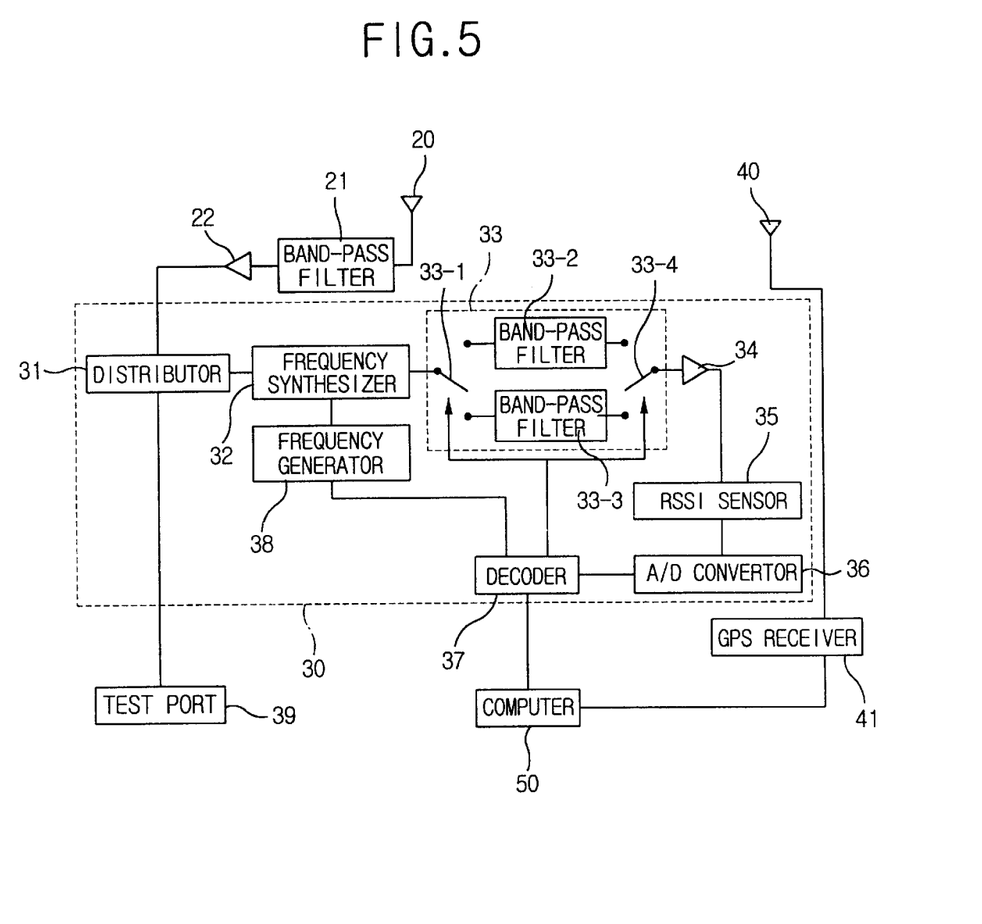
FIG. 5 is a block diagram showing a continuous wave receiver according to an embodiment of the present invention.

FIG. 5 is a block diagram showing a continuous wave receiver according to an embodiment of the present invention.

As shown in FIG. 5, tie continuous wave receiver comprises a receiving antenna 20 for receiving the continuous waves, a band pass filter 21 for filtering the signal received on the receiving antenna 20, an amplifier 22 for amplifying the output from the band pass filter 21, a signal processor 30 for processing the output of the amplifier 22, a test port 39 for testing the output of the amplifier 22, a GPS antenna 40 for receiving a GPS signal, a GPS receiver 41 for receiving the signal from the GPS antenna 40 to analyze GPS information, and a computer 50 for calculating Ec/Io using the output of the signal processor 30 and the GPS receiver 41.

Hereinafter, the operation of the continuous wave receiver according to the present invention will be described in detail.

The wave received on the receiving antenna 20 is filtered by the band pass filter 21 so that a necessary band ($1850^j$= 1860 MHz in the present embodiment) is supplied into the amplifier 22. After being amplified, the signal is inputted into the signal processor 30. The signal inputted into the signal processor 30 is branched by a distributor 31 so as to be provided to the test port 39 and a frequency synthesizer 32. The signal inputted into the test port 39 is used for a test, and the signal inputted into the frequency synthesizer 32 comprises frequencies f0, f1, f2 and f3. For changing these signals into an intermediate frequency (about 70 MHz), it is necessary that the frequency generator 38 be controlled by a decoder 37 so as to periodically and continuously generate frequencies different from each other. The frequencies generated from the frequency generator 38 are synthesized with the signals f0, f1, f2 and f3 and the frequency synthesizer 32 and changed to the intermediate frequency, and then inputted into a switching part 33.

Switches 33-1 and 33-4 of the switch part 33, like the decoder 37, control the frequencies input thereto so as to be converted continuously in a predetermined period.

The band-pass filters 33-2 or 33-3 are selected, in order to filter 1.23 MHz in case of the common frequency, or 30 MHz in the case continuous wave being provided according to the output of the frequency synthesizer 32. Then, the intermediate frequency is inputted into the RSSI detector 35 through the band-pass filter 33-2, 33-3 and the amplifier 34, so the level of the signals f0, f1, and f3 can be detected. Thereafter, the RSSI signal is converted into digital signal by an AD converter 36 and then is inputted into the decoder 37.

Meanwhile, the GPS receiver 41 analyzes the signal received on the GPS antenna 40 into information for example, latitude, longitude, time and so on.

The output from the decoder 37 and the GPS receiver is inputted into the computer 50, to be calculated as follows.

FIGS. 6 through 9 are flow charts for calculating Ec/Io according to the present invention.

Only f1 among the continuous waves will be illustrated for the convenience of illustration.

Figure 6:
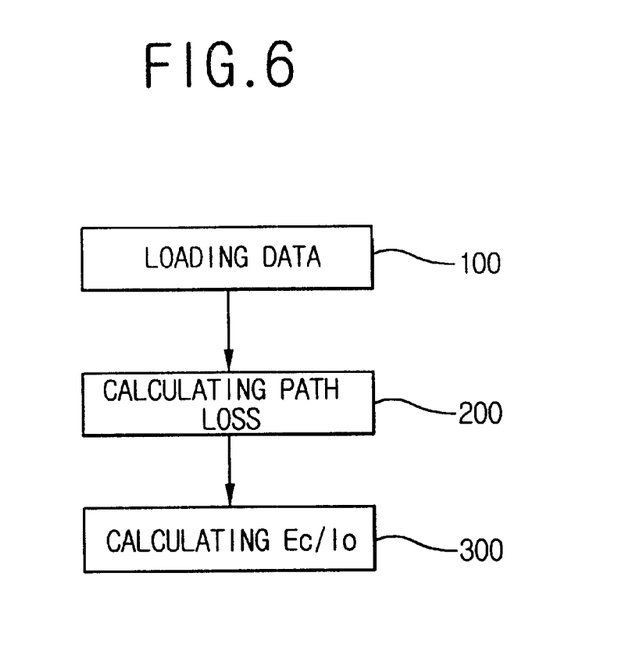
FIG. 6 is a flow chart showing a main algorithm for estimating Ec/Io.

FIG. 6 is a flow chart showing the main algorithm for estimating Ec/Io.

As shown in FIG. 6, the main algorithm for estimating Ec/Io comprises the steps of loading data received from the decoder 40 onto the computer 50 (step 100), calculating a path loss of the each frequency from the data (step 200), and finally, calculating Ec/Io of the each frequency (step 300).

Figure 7:
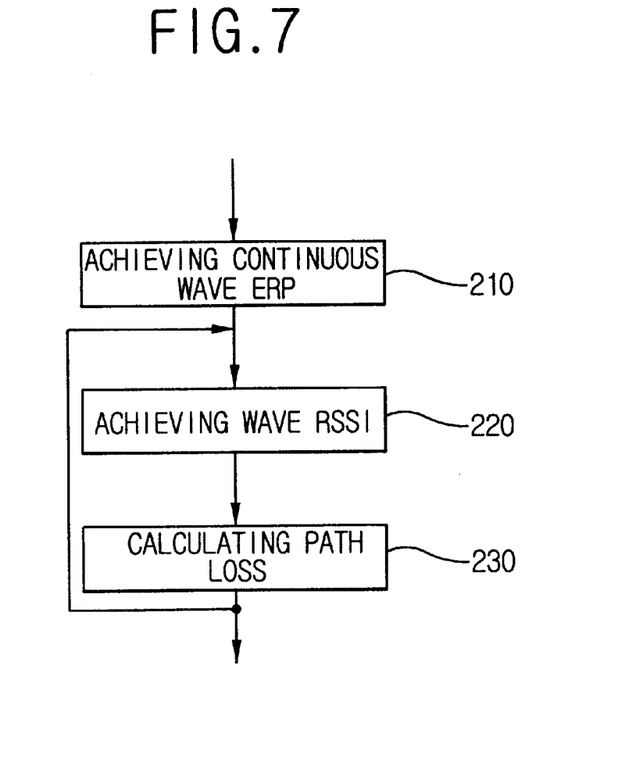
FIG. 7 is a flow chart showing a detailed algorithm for calculating a path loss.

FIG. 7 is a flow chart showing a detailed algorithm for calculating the path loss.

First, effective radiation power (ERP) of the transmitting frequency of the continuous wave is achieved (step 210). Here, suppose the ERP of frequency f1 is equal to 42 dBm (a predetermined value). Then, RSSI of the continuous wave received on the receiver is achieved (step 220). Here, suppose RSSI of frequency f1 measured on a predetermined site (Information about the latitude, longitude and time of this site can be known through the GPS information.) is equal to −80 dBm.

Then, the path loss is achieved by subtracting the RSSI from the ERP (step 230). Here, the path loss becomes 122 dBm. Since the receiver is moved by a vehicle, the steps 220 and 230 are performed periodically and continuously, so the path loss changed according to a variety of positions can be achieved.

Figure 8:
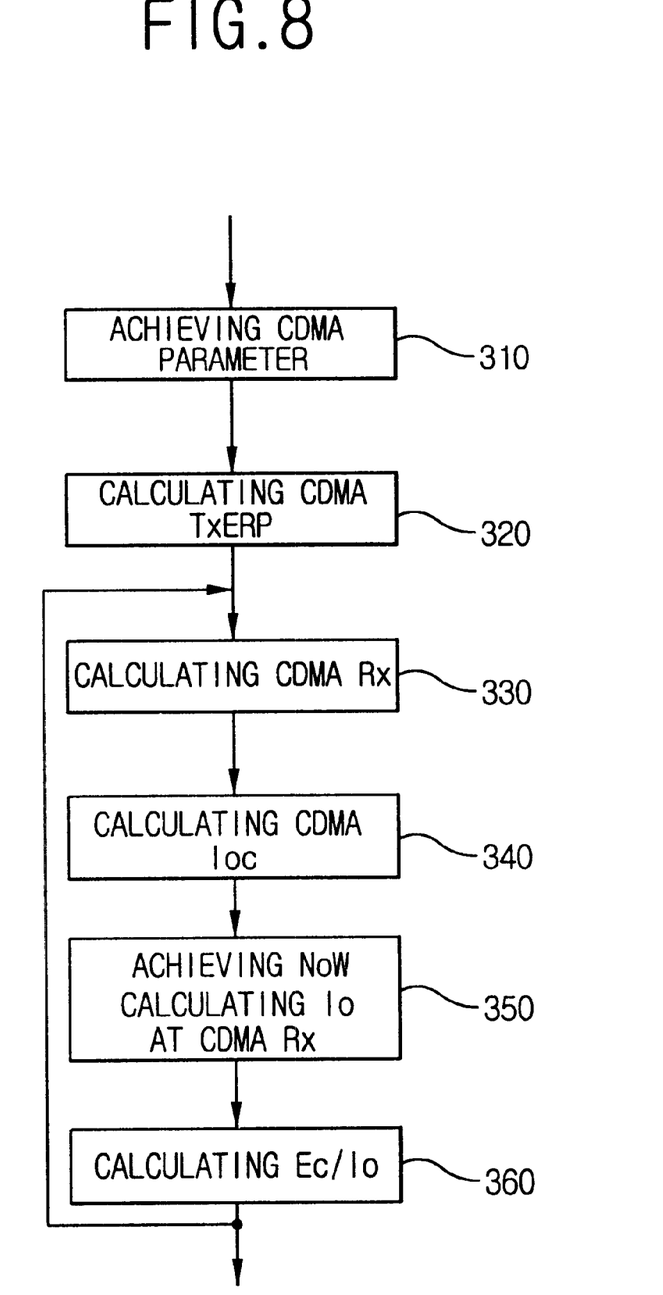
FIG. 8 is a flow chart showing a detailed algorithm for calculating the Ec/Io.

FIG. 8 is a flow chart showing a detailed algorithm of step 300 for calculating Ec/Io.

First, CDMA parameter of the candidate base station is achieved (step 310). Here, the CDMA parameter is a predetermined value about system characteristic of the base station using CDMA, for example, digital gain of a transmitting signal, output characteristic of the amplifier, the number of subscribers in the coverage of the base station and so on. Accordingly, the output of the base station is finally determined according to the CDMA parameter.

Next, the CDMA parameter is calculated and then the ERP (CDMA Tx ERP) of the transmitting signal from the candidate base station f1 is calculated (step 320). Here, suppose, CDMA Tx ERP of the candidate base station is equal to 40.76 dBm.

By subtracting the path loss 122 dBm achieved in the step 230 from CDMA Tx ERP 40.76 dBm(11,92 W) calculated in the step 320, CDMA Rx achieved by the receiver is calculated to be −81.24 dBm(7.51923E-12 W) (step 330).

Then, interference Ioc of an adjacent cell is calculated (step 340).

The interference in CDM Rx achieved in the step 330 is equal to −81.50 dBm(7.087E-12 W) because the self-interference of a communication channel in a corresponding cell is not considered to be an interference.

Accordingly, the interference Io in a corresponding cell is equal to −81.50 dBm(7.087E-12 W).

According to the identical method, Io of f2 and f3 are calculated respectively, and then a predetermined value of NoW=−105.09 dBm(3.101E-14) is substituted (step 350).

Here, Io=−81.50 dBm(7.087E-12 W), NoW=−105.09 dBm(3.101E-14 W), and Ec are included in the pilot signal among the CDMA transmitting signals, and since it is set to be 29.13% of the CDMA Rx −81.24 dBm(7.51923E-12 W), it becomes −86.60 dBm(2.19019E-12 W), and therefore, Ec/Io can be calculated (step 360).

The steps 330 through 360 are performed periodically and continuously, accordingly, they Ec/Io, changed according to the changing site, can be calculated.

Figure 9:
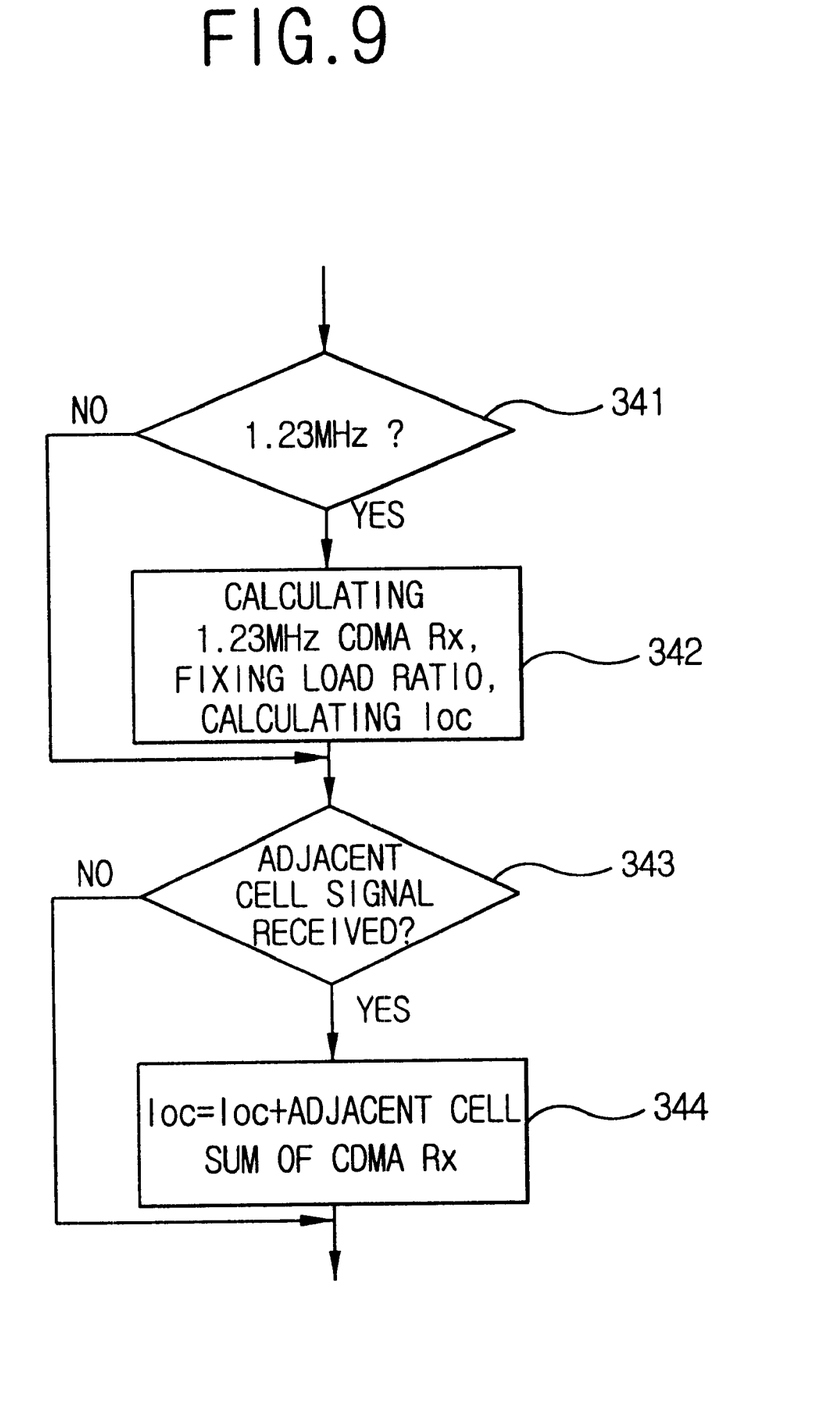
FIG. 9 is a flow chart showing a detailed algorithm for calculating Ioc.

FIG. 9 is a flow chart showing a detailed algorithm for calculating Ioc (step 340).

First, it is judged whether or not a 1.23 MHz signal from an adjacent base station exists (step 341).

If the 1.23 MHz signal exists, RSSI therof (calculated on the receiver) is calculated.

As described above, suppose that CDMA Tx ERP of the 1.23 MHz signal is equal to 40.76 dBm, and if subtracting the path loss 122 dBm achieved in the step 230, CDMA Rx of the 1.23 MHz signal is equal to −81.24 dBm(7.51923E-12 W).

Here, Ioc is calculated by compensating (step 342) a load factor of the adjacent common base station at the time of measurement. (the load factor of the base station depends on time. In the present embodiment, the compensation ratio for load factor is established by 50% of a maximum load.)

In the present embodiment, suppose the load of the adjacent common base station at the time of measurement is equal to 50% of the maximum load, and Ioc is equal to −81.24 dBm(7.51923E-12 W).

Accordingly, Ec/Io=Ec/(Io+Ioc+NoW) can be calculated in the step 360.

Further, using the GPS information of the site at which the Ec/Io is measured, the information about latitude, longitude and time can be achieved.

In the present embodiment, the Ec/Io of each f1, f2 and f3 are calculated, and on the basis of the calculation result, one site among the three candidate base stations is determined as a new base station.

Meanwhile, as shown in FIG. 3, in case a plurality of base stations are to be installed on different sites respectively, unlike the description of FIG. 1, since the output of the transmitter f2 and f3, which have frequency different from that of the transmitter f1, become an. adjacent base signal for the cell of f1 (Because FIG. 1 is an embodiment for positioning a base station at a cell, f1, f2 and f3 don't exert an influence on each other. Accordingly, Io according to the signal f1, f2 and f3 and Ioc according to the 1.23 MHz signal of the adjacent common base station are achieved, and then each of the Ec/Io according to the site f1, f2 and f3 are calculated, Thereafter, the site of die candidate base station is determined on the basis of such a result.), it is necessary to judge whether or not the signal is received (step 343). If received, since either of the frequencies f1 and f2 is considered to be the interference of the adjacent cell as described above, the total Ioc can be calculated by adding CDMA Rx of f2 and f3 (step 344).

As described above, according to the present invention, the measurement for positioning a base station is performed in consideration of an adjacent interference at the actual circumstances, so a new base station can be positioned on a proper site.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. A system for obtaining Ec/Io for a predetermined site for use in positioning a base station used for a mobile communication system using CDMA, comprising:
   a plurality of continuous wave generators for generating continuous waves of constant output power, the continuous waves having frequencies different from each other;

a continuous wave receiver for receiving the continuous waves from the plural of continuous wave generators so as to measure RSSI of the continuous waves, and receiving GPS information at the same time; and a computer for receiving the RSSI of the continuous waves and the GPS information so as to measure Ec/Io of a predetermined site;

wherein the continuous wave receiver comprises:

a receiving antenna for receiving the continuous waves;

a frequency generator for periodically generating a plurality of frequencies different from each other;

a frequency synthesizer for synthesizing an output frequency of the frequency generator and a signal received on the receiving antenna so as to convert into an intermediate frequency;

a switching part for outputting a predetermined signal by periodically switching the intermediate frequency from the frequency synthesizer;

a RSSI sensor for sensing the RSSI from an output of the switching part;

a A/D convertor for converting the RSSI into a digital signal;

a decoder for receiving the digital signal of the RSSI while controlling the output frequency from the frequency generator and a switching operation of the switching part;

a GPS antenna for receiving GPS signal; and a GPS receiver for measuring latitude, longitude and time information from the GPS signal.

2. The system according to claim 1, wherein each of the continuous wave generators comprises:

a key pad for selecting an output frequency and an output power;

a microprocessor for receiving an input of the key pad so as to control the output frequency and the output power, the microprocessor for making a command to display the values of the output frequency and the output power;

a frequency synthesizer for receiving the command from the microprocessor to output a selected frequency;

an output power regulator for receiving the command from the microprocessor to control an output power of the selected frequency;

a high-output amplifier for amplifying a signal from the output power regulator;

and a transmitting antenna for broadcasting an output of the high-output amplifier.

3. The system according to claim 1, wherein the continuous wave receiver also receives frequency of a adjacent common base station so as to measure RSSI thereof.

4. A method for obtaining Ec/Io for a predetermined site for use in positioning a base station used for a mobile communication system using CDMA, comprising the steps of:

a) receiving a plurality of continuous waves different from each other so as to measure RSSI thereof;

b) receiving GPS information to measure latitude, longitude and time;

c) calculating a path loss of each of the continuous waves from the RSSI;

d) calculating CDMA Tx ERP of a candidate base station by using CDMA parameter of a predetermined candidate base station;

e) calculating CDMA Rx by subtracting the path loss from the CDMA Tx ERP;

f) calculating Io form the CDMA Rx;

g) calculating Ec determined by a predetermined ratio fo the CDMA Rx;

h) judging whether frequency of an adjacent cell is received or not so as to calculate Ioc;

i) calculating Ec/Io by substituting a predetermined NoW for the calculated Io, Ioc and Ec; and j) matching the Ec/Io with the GPS information for a predetermined site.

5. The according to claim 4, wherein the a) step further comprises a step for receiving frequency of an adjacent common base station so as to measure RSSI thereof.

6. The method according to claim 4, wherein, in f) step, Io is calculated by a subtracting a self-interference of a communication channel in a corresponding cell.

7. The method according to claim 4, wherein the h) step comprises the steps of:

a) judging whether frequency of an adjacent common base station is received or not; and b) calculating Ioc with the RSSI of the received signal if the frequency of the adjacent commercial base station is received.

8. The method according to claim 7, wherein in the h) step, Ioc is calculated by compensating a load factor of the adjacent common base station at the time of measurement.

9. Obtaining Ec/Io for a predetermined site for use in positioning a base station used for a mobile communication system using CDMA, comprising the steps of:

a) installing a plurality of continuous wave transmitters for generating frequencies different from each other at mutually adjacent cells, respectively;

b) receiving a continuous wave signal from one cell at which one of the continuous wave transmitters is positioned and from another cell adjacent to the one cell among the mutually adjacent cells so as to measure RSSI of each of the signals;

c) receiving GPS iformation to measure latitude, longitude and time;

d) calculating a path loss of each of thee continuous wave signals from the RSSI of each of the received continuous wave signals;

e) calculating CDMA Tx ERP of each candidate base station by using a CDMA parameter of the each candidate base station of a predetermined correspondings cell and an adjacent cell thereof;

f) calculating CDMA Rx by subtracting the path loss from the CDMA Tx ERP of the each candidate base station;

g) calculating Io from CDMA h) calculating Ec determined by a predetermined ratio of the CDMA Rx;

i) judging whether frequency of an adjacent cell is received or not so as to calculate Ioc;

j) calculating Ec/Io by substituting a predetermined NoW for the calculated Io, Ioc and Ec; and k) matching the Ec/Io with the GPS information of a predetermined site.

10. The method according to claim 9, wherein b) step further comprises a step for receiving frequency of an adjacent common base station so as to measure the RSSI thereof.

11. The method according to claim 9, wherein, in the g) step, Io is calculated by subtracting a self-interference of a communication channel in a corresponding cell.

12. The method according to claim 9, wherein the I) step comprises the steps of:

a) judging whether frequency of a adjacent commercial base station is received or not; and b) calculating Ioc with RSSI of the received signal if the frequency of the adjacent common base station is received.

13. The method according to claim 12, wherein, in the b) step, Ioc is calculated by compensating a load factor of the adjacent common base station at the time of measurement.

14. The method according to claim 9, wherein, in the I) step, Ioc is calculated by adding CDMA Rx of the adjacent cell.

15. The method according to claim 9, wherein, in the I) step, Ioc is calculated, if the frequency of the adjacent commercial base station is received, by adding the RSSI of the received signal and the CDMA Rx of the adjacent cell.

16. The method according to claim 15, wherein the Ioc is calculated by compensating a load factor of the adjacent common base station at the time of measurement.

* * * * *